United States Patent Office

3,494,778
Patented Feb. 10, 1970

3,494,778
METHOD OF PRODUCING RAW MATERIALS FOR CROWN CAPS, RAW MATERIAL THEREFOR AND A CROWN CAP WITH A FOAMABLE LINING
Rikichi Hashimoto, 40, 2-chome, Nishihara-machi, Bunkyo-ku, Tokyo, Japan
No Drawing. Filed Mar. 28, 1966, Ser. No. 537,638
Claims priority, application Japan, July 23, 1965, 40/44,803
Int. Cl. B44d 1/46, 1/36
U.S. Cl. 117—14          6 Claims

ABSTRACT OF THE DISCLOSURE

A method is disclosed for the production of raw material to be used in the making of crown caps. A synthetic resin, plasticizer and foaming agent are blended into a powder mass and then applied to a metal plate that has been precoated with an adhesive and has a crown cap pattern printed on the opposite side. The plate is then selectively heated only in areas corresponding to the printed pattern to heat-bond, but not foam, the powder mass to the metal plate. The unbonded powder is removed and can be reused while the bonded portions can be formed into crown caps and the powder mass subsequently foamed.

---

The present invention relates to a method of producing raw materials for crown caps.

DESCRIPTION OF THE PRIOR ART

The previously known methods of producing such packing material for filling caps are given below:

(1) The method of producing resilient packing material in which the crown cap or metal cap is rotated, plastisol is spread on the inside by supplying a fixed quantity of plastisol to the inner surface of the rotating cap after which heat is applied to fuse the foam, and lastly cooling is performed (hereinafter referred to as the "plastisol method").

(2) The method of obtaining packing material in which soft vinyl chloride containing foaming agent is extruded at low temperature (a temperature at which the foaming agent does not decompose) in the form of a rod and thereinafter cutting this into packings of fixed thickness which are inserted into crown caps or metal caps as linings and heated at a fixed temperature to perform gellation and foaming (hereinafter referred to as the "extrusion machine method").

(3) The method of obtaining packing raw material in which soft vinyl chloride containing foaming agent is processed into a sheet at low temperature (a temperature at which the foaming agent does not decompose) and thereinafter punching from this unfoamed raw material packings which are inserted into crown caps or metal caps as linings and simultaneously heated to perform gellation and foaming (hereinafter referred to as the "Calendar method").

(4) The method of making foamed packing material in which a sheet of soft vinyl chloride containing foaming agent is passed through a foaming oven and made into a foamed sheet of constant thickness which is thereinafter punched into packings of fixed diameter (hereinafter referred to as the "foamed sheet method").

However, in these methods, in the plastisol method, extrusion method and Calendar method, the coefficient of heat conductivity is low since the material is in paste or sheet form, and therefore, fusing of the foam at high temperature leads to abnormal foaming in which it is difficult to obtain independent bubbles while, on the other hand, low heat over long periods causes the printing on the crown caps or metal caps to discolor.

Further in the plastisol production method the viscosity and viscosity characteristics give rise to changes in thickness and resilience which are dependent on temperature and time, and therefore, unevenness in thickness is likely to occur. It is the shortcoming of this method then that products of uniform resilience cannot always be obtained.

What is more, in cutting the unfoamed rod material in constant thickness in the extrusion method it is extremely difficult to produce an evenly cut face as there is a tendency for powder particles to be severed and unevenness in thickness to occur.

In the Calendar method directionality (warp) often occurs in the foaming process which follows the process of punching the packings from the sheet, and it becomes impossible to make the packings adhere to the crown cap or metal cap.

In the plastisol method packing material often runs onto parts other than the part upon which packing is to be formed dirtying the crown cap.

An object of the present invention is to provide a method of producing directly packing materials from the resin powder, in which the number of production steps and time consumed are both much less than with the previously known extrusion machine method or calendar method and there is no loss of product in the intermediate process, and as irregularities in the intermediate product are avoided, and a uniform product is obtained.

Another object of the invention is to provide a method of making crown caps.

DESCRIPTION OF PREFERRED EMBODIMENTS

These objects are accomplished by the present invention by applying synthetic resin powder containing plasticizer, said powder being in a soft solid state in constant thickness and constant diameter to a metal plate upon which the crown cap pattern has been printed, at a position on the reverse face corresponding to such printed portion, such soft solid state resin powder and metal plate being heat-bonded thus providing raw material for crown caps to which unfoamed packing material has been joined.

The following is a description of this method with respect to working examples:

|  | Parts |
|---|---|
| Vinyl chloride (Sumitomo SX–11) (coarse mesh powder obtained by suspension polymerization method) | 100 |
| Vinyl chloride (Sumitomo PX–11) (fine mesh powder obtained by emulsion polymerization method) | 5–30 |
| Heavy calcium carbonate | 10–60 |
| Foaming agent | 1–5 |
| Coloring agent | 2–4 |
| Stabilizer | 1–3 |
| Plasticizer (paraffin system) | 5–15 |
| Main plasticizer (non-toxic) | 40–100 |

The resin powder and materials mentioned above are blended by means of high speed agitation at a temperature of 70° C. to 130° C. for 10 to 20 minutes, thus producing a soft solid state resin powder containing the plasticizer compounds.

Next, as the metal plate upon which the crown cap pattern has been printed is brought beneath a hopper, the said powder is applied in a successive manner upon the adhesive-coated face opposite the printed face and formed in constant thickness by a doctor knife. An electrode is pressed onto the metal plate to which the powder has been applied in constant thickness by the method described, at a position corresponding to the printed portion, and heat-bonding is performed by high frequency heating.

By this means raw material for crown caps is obtained in the form of a metal plate upon the back face of which a multiplicity of spots of unfoamed packing raw material have been distributed. The raw material for crown caps thus obtained can be punched and formed into crown caps by the ordinary method, and then further heated to completely foam the unfoamed packing raw material. Thus a crown cap filled with packing material is obtainable.

In this case the resin powder other than that portion which was heat-bonded can be appropriately removed and returned to the hopper for reuse. In the present invention it can be seen that, as a means for applying the resin powder in constant thickness to the metal plate, it is possible, in addition to the method described above, to place over the back face of the metal plate a templet provided with a multiplicity of holes in positions corresponding to the printed portions, then to spray or pour the resin powder thereover and thereafter press electrodes of the same diameter as the holes into the holes and perform heat-bonding. By this method an accurately formed packing material can be obtained.

However, in this case, the alignment of the templet and the metal plate must be performed accurately. Although the working example above has been explained with soft vinyl chloride as the raw material, it is also possible to employ polyethylene compounded with a foaming agent and polystyrol compounded with a foaming agent as the raw material.

As in the present invention unfoamed packing raw material is applied to the metal plate prior to formation of the crown caps, the multiplicity of caps punched and formed in the conventional method from the metal plate are already filled with packing raw material and thus the time and labor necessary for filling each crown cap individually is saved.

What is more, in the hitherto known method of punching and forming crown caps from a metal plate to which packing material of the same shape and same size as the metal plate had been applied beforehand, not only was the packing material subject to damage but the packing material on portions other than the portions punched out was not recoverable and was lost as wasted material.

It is therefore a special feature of the present invention that no packing material is wasted since only the packing raw material necessary for one crown cap is attached to the face opposite each printed portion.

Also, since with the present invention the resin compound powder is merely heat-bonded, the packing raw material is in spongy form and thus conducts heat rapidly allowing for quick formation of a fused foam. Consequently, time consumed in formation is reduced, and further in the heat operation the temperature can be raised uniformly thus allowing for uniform fusion of the resin. As the foaming agent decomposes after formation, packing material with air-bubbles of uniform size is obtainable regardless of thickness. With the present invention it is possible even without vinyl chloride produced by the expensive emulsion polymerization method to use vinyl chloride etc. produced by the cheap suspension polymerization method, and therefore packings with superb physical properties are producible at low cost.

I claim:

1. A method of producing a raw material for the formation of crown caps with a foamable packing comprising the steps of blending a synthetic resin powder with a plasticizer and a foaming agent into a soft foamable powder mass, applying said mass in a layer of constant thickness to one side of a metal plate precoated with an adhesive the opposite side of which has printed upon it a crown cap pattern, selectively heating said plate with said mass only in areas corresponding to the printed crown cap pattern to a temperature sufficient to heat-bond said mass but below that necessary to cause foaming of the mass, and removing the portions of said mass not corresponding to the crown cap pattern.

2. A method as claimed in claim 1 wherein the step of selectively heating said plate with said mass is in areas of the prints from said coated side.

3. A method as claimed in claim 1, said mass comprising

| | Parts |
|---|---|
| Vinyl chloride (coarse mesh powder obtained by suspension polymerization method) | 100 |
| Vinyl chloride (fine mesh powder obtained by emulsion polymerization method) | about 5–30 |
| Heavy calcium carbonate | 10–60 |
| Foaming agent | 1–5 |
| Coloring agent | 2–4 |
| Stabilizer | 1–3 |
| Paraffin plasticizer | 5–15 |
| Main plasticizer (non-toxic) | 40–100 |

4. A method as claimed in claim 2, said mass being blended at a temperature between about 70° C. to 130° C. for about 10 to 20 minutes.

5. A method as claimed in claim 2, said step of heating comprising the step of applying high frequency electrode heating to said coated side at a temperature bolew the foaming stage of said mass.

6. A method as claimed in claim 2 further comprising the steps of forming said material into crown caps and of additionally heating the crown caps to foam said mass.

References Cited

UNITED STATES PATENTS 2,334,112   11/1943   MacKinney _____ 117—25
2,528,506   11/1950   Foye _____ 215—40 X
3,029,765   4/1962   Navikas.

ALFRED L. LEAVITT, Primary Examiner

C. R. WILSON, Assistant Examiner

U.S. Cl. X.R.

113—121; 117—21, 119.6